US008655578B2

(12) United States Patent
Sambongi (10) Patent No.: US 8,655,578 B2
(45) Date of Patent: Feb. 18, 2014

(54) POSITIONING DEVICE, POSITIONING METHOD AND STORAGE MEDIUM (75) Inventor: Masao Sambongi, Hachioji (JP)

(73) Assignee: Casio Computer Co., Ltd, Tokyo (JP)

( * ) Notice: Subject to any disclaimer, the term of this patent is extended or adjusted under 35 U.S.C. 154(b) by 462 days.

(21) Appl. No.: 12/950,205

(22) Filed: Nov. 19, 2010

(65) Prior Publication Data
US 2011/0148696 A1  Jun. 23, 2011

(30) Foreign Application Priority Data

Dec. 22, 2009 (JP) ................................. 2009-289937
Oct. 22, 2010 (JP) ................................. 2010-236962

(51) Int. Cl.
G01S 19/00 (2010.01)
G01S 19/01 (2010.01)

(52) U.S. Cl.
USPC ........... 701/214; 701/400; 701/408; 701/434; 701/468; 701/469; 701/475; 701/478; 701/500; 701/501; 340/988; 340/995.25; 342/356; 342/357.2; 342/357.21; 342/357.23; 342/357.22; 342/357.24; 342/357.25; 342/357.31; 342/357.32; 342/357.39

(58) Field of Classification Search
None
See application file for complete search history.

(56) References Cited

U.S. PATENT DOCUMENTS

| 5,504,492 | A | * | 4/1996 | Class et al. ................ 342/357.31 |
| 5,623,414 | A | * | 4/1997 | Misra ............................ 701/478 |
| 5,828,336 | A | * | 10/1998 | Yunck et al. ............. 342/357.31 |
| 6,642,886 | B2 | * | 11/2003 | King ......................... 342/357.67 |
| 6,684,158 | B1 | * | 1/2004 | Garin et al. .................... 701/470 |
| 6,995,792 | B1 | | 2/2006 | Ogura |
| 7,529,157 | B2 | | 5/2009 | Nakagawa |
| 7,711,481 | B2 | * | 5/2010 | Mutoh .......................... 701/478 |
| 8,351,301 | B2 | * | 1/2013 | Fujisawa ........................ 368/47 |
| 8,378,889 | B2 | * | 2/2013 | Yu et al. .................... 342/357.62 |
| 2002/0113732 | A1 | * | 8/2002 | King ......................... 342/357.11 |
| 2002/0113734 | A1 | * | 8/2002 | King ......................... 342/357.13 |
| 2002/0136094 | A1 | * | 9/2002 | Kawai .............................. 368/47 |
| 2003/0201935 | A1 | * | 10/2003 | King et al. ................ 342/357.15 |
| 2005/0135194 | A1 | * | 6/2005 | Ishii ................................. 368/47 |
| 2005/0174286 | A1 | * | 8/2005 | Lokshin et al. .......... 342/357.12 |
| 2006/0071851 | A1 | * | 4/2006 | Graas et al. ............... 342/357.14 |

(Continued)

FOREIGN PATENT DOCUMENTS

| CN | 101410765 A | 4/2009 |
| CN | 101410765 B | 11/2010 |
| JP | 08-327718 | 12/1996 |
| JP | 10-082875 | 3/1998 |

(Continued)

OTHER PUBLICATIONS

Japanese Office Action for Japanese Application No. 2010-236962 mailed on Nov. 1, 2011.

(Continued)

Primary Examiner — Jonathan M. Dager
(74) Attorney, Agent, or Firm — Turocy & Watson, LLP (57) ABSTRACT An electronic device 1 receives ephemeris information from a GPS satellite at intermittent timings TE1, TE2, and TE3 and stores the received information in its memory. In addition, the electronic device 1 receives time information at intermittent timings TC1, TC2, TC3, and TC4, and corrects a clocked time based on the received time information. Then, at positioning timing T1, the electronic device 1 captures a transmission signal from the GPS satellite while synchronizing timing with the GPS satellite based on the clocked time, and performs positioning based on the captured transmission signal and the ephemeris information stored in the memory.

8 Claims, 6 Drawing Sheets (56) References Cited

U.S. PATENT DOCUMENTS

| | | | | |
|---|---|---|---|---|
| 2007/0230285 | A1* | 10/2007 | Nakagawa | 368/47 |
| 2008/0174483 | A1* | 7/2008 | Bryant et al. | 342/357.06 |
| 2009/0109088 | A1* | 4/2009 | Bryant et al. | 342/357.05 |
| 2009/0128403 | A1* | 5/2009 | Bryant et al. | 342/357.02 |
| 2009/0278738 | A1* | 11/2009 | Gopinath | 342/357.12 |
| 2010/0194634 | A1* | 8/2010 | Biacs et al. | 342/357.09 |
| 2010/0225534 | A1* | 9/2010 | Hanabusa | 342/357.25 |
| 2010/0278220 | A1* | 11/2010 | Weill | 375/150 |
| 2011/0007783 | A1* | 1/2011 | Weill | 375/150 |
| 2011/0205107 | A1* | 8/2011 | Sambongi | 342/357.25 |

FOREIGN PATENT DOCUMENTS

| | | |
|---|---|---|
| JP | 2001166366 | 6/2001 |
| JP | 2002267734 | 9/2002 |
| JP | 2006339723 | 12/2006 |
| JP | 2009-063588 | 3/2009 |

OTHER PUBLICATIONS

Notification of the First Office Action for Chinese Application No. 2010106118511 Dated Aug. 14, 2012, 21 pgs.

* cited by examiner

POSITIONING DEVICE, POSITIONING METHOD AND STORAGE MEDIUM

CROSS-REFERENCE TO RELATED APPLICATION

This application is based upon and claims the benefit of priority from the prior Japanese Patent Applications No. 2009-289937 filed Dec. 22, 2009 and No. 2010-236962 filed Oct. 22, 2010, the entire contents of which is incorporated herein by reference.

BACKGROUND OF THE INVENTION

1. Field of the Invention

The present invention relates to a positioning device that determines position by receiving a signal from a positioning satellite, a positioning method, and a storage medium.

2. Description of the Related Art

Conventionally, there have been electronic devices having a global positioning system (GPS) function which intermittently determine position at predetermined time intervals, or those which determine position in conjunction with a certain operation such as shooting an image with a camera (refer to, for example, Japanese Patent Application Laid-Open (Kokai) Publication No. 2002-267734, Japanese Patent Application Laid-Open (Kokai) Publication No. 2006-339723, and U.S. Pat. No. 6,995,792).

GPS positioning devices calculate a pseudo range to each of a plurality of GPS satellites based on positional codes received from the GPS satellites, and after calculating the position of each GPS satellite based on ephemeris information, determine their own positions using these calculation results.

Once received, this ephemeris information can be used for several hours to calculate the position of a single GPS satellite. Therefore, in a typical GPS positioning device that intermittently determines its position, ephemeris information received during a previous positioning processing is stored in the memory, and if there is valid ephemeris information in the memory at the time of the subsequent positioning processing, the position of the device is quickly determined using this ephemeris information.

Radio waves transmitted from a GPS satellite are weak spread-spectrum radio waves, and in order to capture and demodulate these radio waves, the transmitting end and the receiving end are required to be synchronized when reception processing therefore is performed.

However, although the GPS satellite has accurate time information from an atomic clock, a clock circuit mounted in the receiving-end device is not as accurate. If there is any margin of error in the time clocked by the clock circuit, capturing and demodulating the radio waves consume more time due to mismatched timing between the transmitting end and the receiving end.

Accordingly, there is a problem in conventional positioning devices in that, even when valid ephemeris information has been stored therein and thus their position should be determined in a short amount of time, capturing radio waves consumes time due to the margin of error in the clocked time, and consequently the total amount of time required for the positioning is increased.

SUMMARY OF THE INVENTION

An object of the present invention is to provide a positioning device capable of completing positioning processing in a short amount of time even when the positioning processing is performed intermittently, a positioning method, and a storage medium.

In accordance with one aspect of the present invention, there is provided a positioning device comprising: a reception means for receiving a signal transmitted from a positioning satellite; a clocking means for clocking time; a first reception control means for receiving route information required for positioning from the positioning satellite via the reception means; a storage means for storing the received route information; a second reception control means for receiving time information indicating time from the positioning satellite via the reception means; a time correction means for correcting the time clocked by the clocking means based on the received time information; and a positioning means for capturing the signal transmitted from the positioning satellite based on the time clocked by the clocking means and performing positioning based on the transmitted signal and the route information stored in the storage means; wherein the first reception control means intermittently receives the route information at a predetermined reception interval, and the second reception control means intermittently receives the time information even during a period in which the positioning by the positioning means is not performed.

In accordance with another aspect of the present invention, there is provided a positioning method of performing positioning using a reception means for receiving a signal transmitted from a positioning satellite and a clocking means for clocking time, comprising: a first reception control step of receiving route information required for the positioning from the positioning satellite via the reception means; a route information storage step of storing the received route information in a storage means; a second reception control step of receiving time information indicating time from the positioning satellite via the reception means; a time correction step of correcting the time clocked by the clocking means based on the received time information; and a positioning step of capturing the signal transmitted from the positioning satellite and received by the reception means based on the time clocked by the clocking means, and performing positioning based on the transmitted signal and the route information stored in the storage means; wherein the route information is intermittently received at a predetermined reception interval in the first reception control step, and the time information is intermittently received even during a period in which the positioning in the positioning step is not performed, in the second reception control step.

In accordance with another aspect of the present invention, there is provided a non-transitory computer-readable recording medium having a program stored thereon which is executable by a computer controlling reception processing for receiving a signal transmitted from a positioning satellite and clocking processing for clocking time, the program being executable to perform functions comprising: first reception control processing for receiving route information required for positioning from the positioning satellite through the reception processing; route information storage processing for storing the received route information in a storage section; second reception control processing for receiving time information indicating time from the positioning satellite through the reception processing; time correction processing for correcting the time clocked by the clocking processing based on the received time information; and positioning processing for capturing the signal transmitted from the positioning satellite in the reception processing based on the time clocked by the clocking processing, and performing positioning based on the transmitted signal and the route information stored in the storage processing; wherein the route information is intermittently received at a predetermined reception interval in the first reception control processing, and the time information is intermittently received even during a period in which the positioning by the positioning processing is not performed, in the second reception control processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings.

Figure 1:
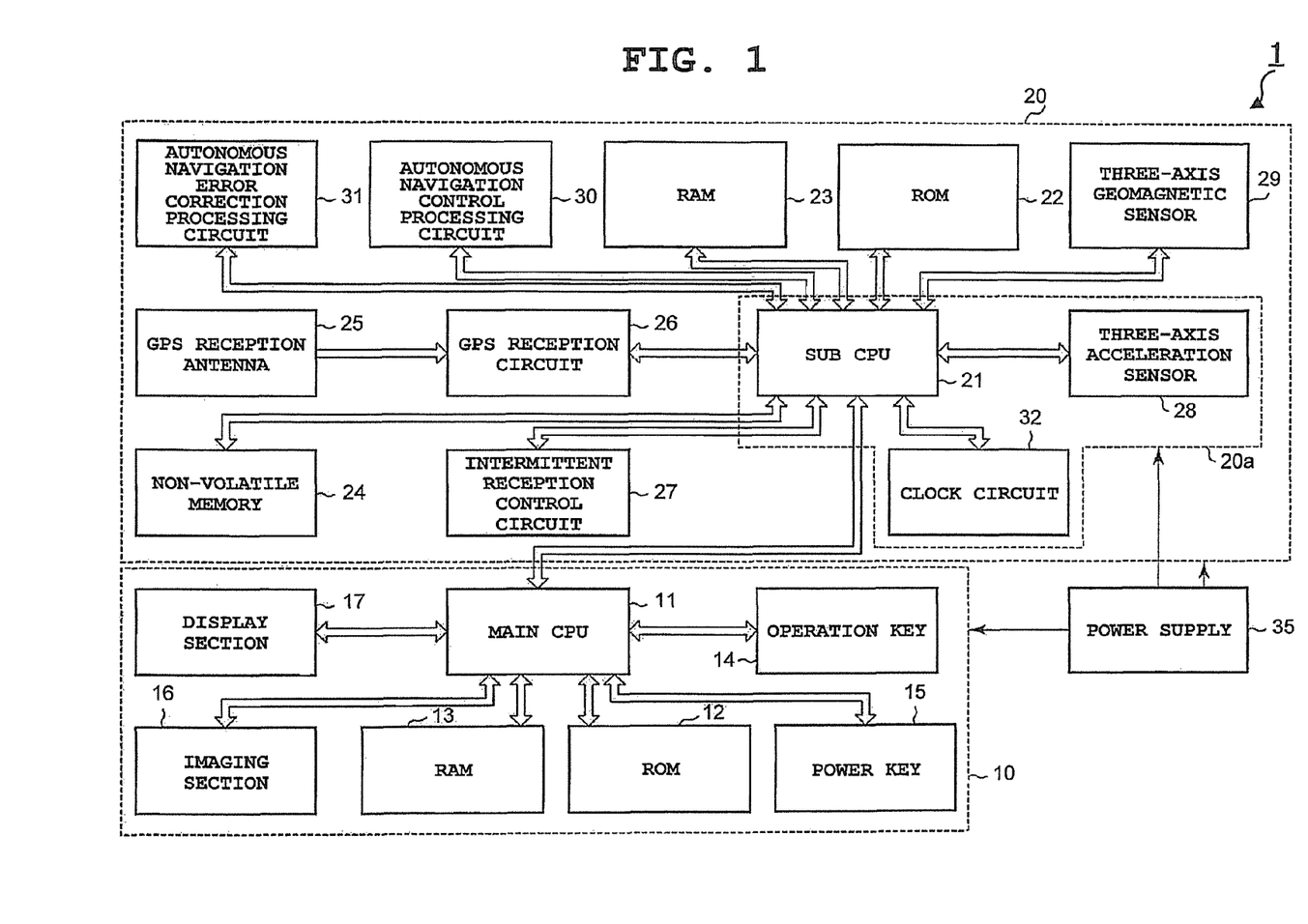
FIG. 1 is a block diagram showing an overall electronic device according to an embodiment of the present invention.

FIG. 1 is a block diagram showing an overall electronic device 1 serving as a positioning device according to an embodiment of the present invention.

The electronic device 1 according to the embodiment, which has an imaging function for storing an image captured by electronic imaging as image data and a positioning function by GPS and autonomous navigation, is capable of associating image data acquired by the imaging function with position data acquired by the positioning function, and storing them.

As shown in FIG. 1, the electronic device 1 includes a first processing section 10, a second processing section 20, a power supply 35, etc. The first processing section 10 performs processing related to the imaging function and a user interface function, and the second processing section 20 performs processing related to the positioning function. The power supply 35 supplies power supply voltage to each section.

The first processing section 10 includes a main central processing unit (CPU) 11 that performs arithmetic processing, a read-only memory (ROM) 12 that stores control programs executed by the main CPU 11 and control data, a random access memory (RAM) 13 that provides the main CPU 11 with working memory space, an operation key 14 that is used to externally input instructions, a power key 15 (power supply switching means) that is used to input an operation for switching power supply, an imaging section 16 that performs imaging using an image sensor such as a charge-coupled device (CCD), and a display section 17 including a liquid crystal display that displays various information.

The second processing section 20 includes a sub CPU 21 that performs arithmetic processing, a ROM 22 that stores control programs executed by the sub CPU 21 and control data, a RAM 23 that provides the sub CPU 21 with working memory space, a non-volatile memory 24 (storage means) that stores reception control data, a GPS reception antenna 25 (reception means) that receives radio waves sent from a GPS satellite, a GPS reception circuit 26 (reception means) that captures and demodulates transmission signals from a GPS satellite, an intermittent reception control circuit 27 that performs control related to the intermittent reception of ephemeris information and time information, a three-axis acceleration sensor 28 (movement detection means) that detects acceleration in three axial directions, a three-axis geomagnetic sensor 29 that detects the intensity of geomagnetism in three axial directions, autonomous navigation control processing circuit 30 that acquires current position data through autonomous navigation based on outputs from the three-axis acceleration sensor 28 and the three-axis geomagnetic sensor 29, autonomous navigation error correction processing circuit 31 that corrects position data acquired through autonomous navigation when positioning is performed by GPS, a clock circuit 32 (clocking means) that performs clocking based on, for example, signals from a crystal oscillator.

The sub CPU 21 actualizes functions of a computer, first reception control means, second reception control means, time correction means, and positioning means.

In this electronic device 1, three-system switching control is performed for power supply to each section by the power supply 35. In the first processing section 10, the supply and the cut-off of power are switched by the power key 15 being operated, whereby the first processing section 10 is switched between an operating state and a stopped state.

In the second processing section 20, power is constantly supplied to a continuous operation section 20a that includes the sub CPU 21, the clock circuit 32, and the three-axis acceleration sensor 28. The state of power supply to other sections of the second processing section 20 is switched under the control of the sub CPU 21. That is, the operation mode of the sub CPU 21 is switched between a sleep state and an activated state based on the operation state of the first processing section 10 and output from the three-axis acceleration sensor 28. When the operation mode is set to the activated state, power supply to the overall second processing section 20 is continued, and when the operation mode is set to the sleep state, power supply to all the sections of the second processing section 20 excluding the continuous operation section 20a is stopped.

The GPS reception circuit 26 captures and demodulates spread-spectrum radio waves transmitted from each of a plurality of GPS satellites by performing reverse-spread processing using a predetermined spread code, while synchronizing processing timing with the GPS satellites. In the initial stage of reception processing, the GPS reception circuit 26 synchronizes processing timing with each GPS satellite in accordance with the time clocked by the clock circuit 32. However, when the timing is off and transmitted radio waves cannot be captured, the GPS reception circuit 26 repeats the reception processing while changing the processing timing, thereby finding processing timing that is synchronous with each GPS satellite, and capturing and demodulating radio waves transmitted from the GPS satellites. Therefore, although radio waves transmitted from the GPS satellites can be captured in a very short amount of time when the clocked time of the clock circuit 32 is accurate, capturing transmitted radio waves consumes time when there is a large margin of error in the clocked time of the clock circuit 32.

The intermittent reception control circuit 27 performs control for receiving required ephemeris information and time information via the GPS reception circuit 26. This reception control starts in response to an instruction from the sub CPU 21 and ends with the completion of the reception. Specifically, when an instruction to start the intermittent reception of ephemeris information is received from the sub CPU 21, the intermittent reception control circuit 27 receives input of demodulation data sent from the GPS reception circuit 26 and monitors to determine whether or not required ephemeris information has been received. Then, when it is determined that ephemeris information from a required number of GPS satellites has been received, the intermittent reception control circuit 27 informs the sub CPU 21 of the completion of the reception. Similarly, when an instruction to start the intermittent reception of time information is received from the sub CPU 21, the intermittent reception control circuit 27 receives input of demodulation data sent from the GPS reception circuit 26 and monitors to determine whether or not time information has been received. Then, when it is determined that time information has been received, the intermittent reception control circuit 27 informs the sub CPU 21 of the completion of the reception.

The non-volatile memory 24 stores a plurality of position data that are positioning results, as well as ephemeris information from a plurality of GPS satellites intermittently received by an instruction from the sub CPU 21.

In addition to control processing for controlling the overall second processing section 20, the sub CPU 21 performs processing for determining the current position of the electronic device 1 by operating the GPS reception circuit 26 and performing a predetermined position calculation. In this position calculation, a pseudo range to each of a plurality of GPS satellites is calculated based on positional codes transmitted from the GPS satellites, and the position of each GPS satellite is calculated using ephemeris information stored in the non-volatile memory 24. The sub CPU 21 calculates its own position based on these calculation results.

The three-axis acceleration sensor 28 provides a function as an autonomous navigation sensor for performing positioning through autonomous navigation and a function as a movement detection means for detecting whether or not the electronic device 1 is in use. That is, when functioning as a autonomous navigation sensor, the three-axis acceleration sensor 28 measures the direction of gravitational force to identify the orientation of the electronic device 1, and also measures acceleration changes in the gravitational force direction to determine the walking action (number of steps) of a user carrying the electronic device 1.

When functioning as movement detecting means, the three-axis acceleration sensor 28 judges whether or not a certain amount or more of acceleration change has been occurring for a certain period of time (such as 30 seconds or a minute) or more, and outputs an activation control signal to an activation terminal of the sub CPU 21 based on this judgment. Specifically, when judged that a certain amount or more of acceleration change has been occurring, the three-axis acceleration sensor 28 outputs an activation control signal at an effective level. Conversely, when judged that a certain amount or more of acceleration change has not been occurring for a certain period of time or more, the three-axis acceleration sensor 28 outputs an activation control signal at an ineffective level. As a result of the control of the activation terminal by the three-axis acceleration sensor 28, the sub CPU 21 is able to switch between the activated state and the sleep state while the power of the electronic device 1 is OFF.

The three-axis geomagnetic sensor 29 measures the magnetic north direction to identify the orientation of the electronic device 1 when positioning is performed through autonomous navigation. Also, in order to identify the walking direction of a user carrying the electronic device 1, the three-axis geomagnetic sensor 29 measures the rocking motion and the horizontal rolling motion of a body accompanying walking motion.

The autonomous navigation control processing circuit 30, which is an arithmetic circuit for assisting arithmetic processing performed by the sub CPU 21, receives input of measurement data from the three-axis geomagnetic sensor 29 and the three-axis acceleration sensor 28 via the sub CPU 21 at a predetermined sampling frequency, and calculates the movement direction and the movement amount of the electronic device 1 from the measurement data. Specifically, the autonomous navigation control processing circuit 30 counts the number of steps taken by a user carrying the electronic device 1 based on a measurement result of acceleration change in the vertical direction from the three-axis acceleration sensor 28, and determines his or her relative movement amount by multiplying the counted number of steps by stride length data set and entered in advance. Also, the autonomous navigation control processing circuit 30 determines the orientation of the electronic device 1 based on a measurement result of the gravitational force direction from the three-axis acceleration sensor 28 and a measurement result of the magnetic north direction from the three-axis geomagnetic sensor 29, and determines the walking direction (in other words, the movement direction) of a user carrying the electronic device 1 based on measurement results of rocking motion and horizontal rolling motion accompanying walking motion from the three-axis geomagnetic sensor 29.

Moreover, the autonomous navigation control processing circuit 30 acquires position data of each point along a transfer path by integrating vector data composed of a movement amount and a movement direction determined as described above with position data of a reference point provided by the sub CPU 21, and stores the acquired position data in the non-volatile memory 24.

The autonomous navigation error correction processing circuit 31, which is an arithmetic circuit for assisting the arithmetic processing performed by the sub CPU 21, performs a predetermined error correction on a plurality of position data acquired through autonomous navigation and stored in the non-volatile memory 24, based on an instruction from the sub CPU 21. In this error correction, when accurate position data is acquired by GPS positioning, position data acquired through autonomous navigation before and after this GPS positioning are corrected based on the accurate position data, in a manner to match the accurate position data.

The ROM 12 of the first processing section 10 stores a control program under which display contents of the display section 17 are changed based on input from the operation key 14, the imaging section 16 is driven for capturing image data, and current position data is acquired from the second processing section 20 and stored in association with image data.

The ROM 22 of the second processing section 20 stores a program for positioning control processing for performing positioning through GPS and autonomous navigation. In addition to being stored in the ROM 22, the program for the positioning control processing can be stored, for example, in a portable storage medium such as an optical disk or a non-volatile memory such as a flash memory that can be read by the sub CPU 21 via a data reading device. Also, a technique is applicable in which a program such as this is downloaded onto the electronic device 1 via a communication line, with a carrier wave serving as a medium.

Next, the positioning control processing performed by the electronic device 1 configured as described above will be described.

Figure 2:
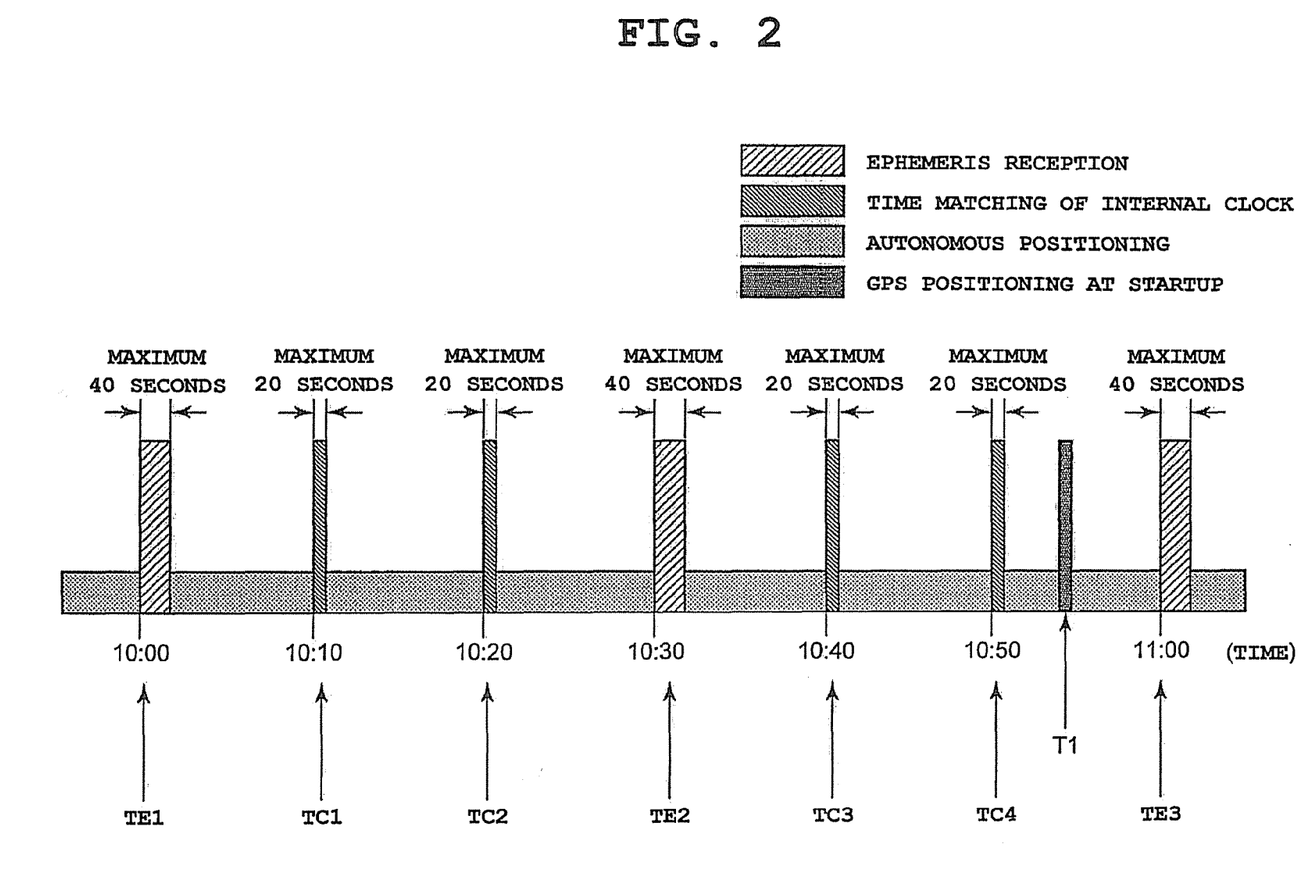
FIG. 2 is an explanatory diagram showing an example of operations in positioning control processing performed by the electronic device.

FIG. 2 is an explanatory diagram showing an example of operations in the positioning control processing of the electronic device 1.

As shown in FIG. 2, in the electronic device 1 according to the embodiment, positioning by GPS is performed in a short amount of time under control of the sub CPU 21, at timing T1 at which the electronic device 1 is actuated by the operation of the power key 1.

Specifically, when the electronic device 1 is actuated at timing T1, the main CPU 11 notifies the sub CPU 21 of the actuation of the electronic device 1, and the GPS positioning processing is initiated under control of the sub CPU 21. In the GPS positioning processing, the GPS reception circuit 26 quickly captures radio waves transmitted from the GPS satellite by the synchronization of the reception processing based on the time clocked by the clock circuit 32. In addition, the sub CPU 21 quickly acquires current position data of the electronic device 1 by performing position calculation using ephemeris information stored in the non-volatile memory 24.

In order to quickly accomplish the GPS positioning processing which is initiated at an arbitrary timing as described above, in the electronic device 1 according to the embodiment, processing is performed in which ephemeris information is intermittently received from a plurality of GPS satellites as navigation information and stored in the non-volatile memory 24 even during periods where the positioning processing is not required to be performed, as indicated by timings TE1, TE2, and TE3 in FIG. 2.

In addition, in the electronic device 1 according to the embodiment, time-matching processing is performed in which time information is received from the GPS satellites at intervals shorter than those for receiving ephemeris information and errors in the time clocked by the clock circuit 32 are corrected even during periods where the positioning processing is not performed, as indicated by timings TC1, TC2, TC3, and TC4 in FIG. 2.

The reception interval for ephemeris information is set, for example, to a fixed time of 30 minutes. The amount of time from when a single GPS satellite enters a radio wave receivable range until it exits the range is about four hours, and ephemeris information is updated every two hours. Accordingly, as a result of ephemeris information from a plurality of GPS satellites from which radio waves can be received being acquired and stored at 30-minute intervals, a state where required ephemeris information is held can constantly be maintained even in the case where GPS positioning is performed at an arbitrary timing.

Note that the reception interval for ephemeris information is not limited to 30 minutes. For example, if the reception interval is set to an interval that is within an hour, the state where ephemeris information required for positioning is held can constantly be maintained. In addition, the reception interval is not necessarily required to be a constant interval and may be a predetermined reception interval whose length changes under predetermined conditions. For example, the reception interval can be lengthened when numerous valid ephemeris information are held (latest ephemeris information from GPS satellites within a radio wave receivable range), and shortened when valid ephemeris information are few.

The reception interval for time information is set, for example, to a fixed time of ten minutes. In the clock circuit 32 which uses a crystal oscillator, a larger margin of error occurs in the clocked time compared to that of a GPS satellite. However, this margin of error can be reduced by processing that synchronizes its time information with that of a GPS satellite being performed every ten minutes. As a result, synchronization with the GPS satellite side can be quickly performed based on clock data of the clock circuit 32, and the GPS reception circuit 26 can capture radio waves in a short amount of time. Note that the reception interval for time information is not limited to ten minutes. The reception interval of the clock circuit 32 can be lengthened when the margin of error is small and shortened when the margin of error is large. In addition, the reception interval can be a predetermined reception interval whose length changes under predetermined conditions, rather than being a fixed amount of time.

Moreover, in the electronic device 1, since time information can also be received along with the above-described intermittent reception of ephemeris information (TE1, TE2, and TE3), the reception of time information and the time-matching processing for the clock circuit 32 are performed concurrently therewith. In addition, since positional code required for position calculation is acquired along with the reception of ephemeris information, processing is also performed which acquires current position data by a position calculation.

The above-described processing for intermittent reception of ephemeris information and time information is performed both when the power of the electronic device 1 is ON and when the power is OFF. However, the electronic device 1 is judged to be completely unused during a period where the power is OFF and an activation control signal outputted to the sub CPU 21 from the three-axis acceleration sensor 28 is at an ineffective level. Therefore, the above-described intermittent reception processing and power supply to each section of the second processing section 20 excluding the continuous operation section 20a are terminated during this period.

Furthermore, in the electronic device 1 according to the embodiment, positioning through autonomous navigation (referred to as "autonomous positioning" in FIG. 2) by the autonomous navigation control processing circuit 30 is constantly performed excluding the period during which the power is OFF and an activation control signal from the three-axis acceleration sensor 28 is at an ineffective level. In addition, when GPS positioning is performed at timings T1, TE1, TE2, and TE3 in FIG. 2, the autonomous navigation error correction processing circuit 31 corrects position data previously acquired by autonomous navigation positioning to more accurate position data, based on the position data acquired through GPS.

Note that, since the electronic device 1 according to the embodiment is configured to keep information regarding its movement path by autonomous navigation positioning and requires position data acquired through GPS for autonomous navigation positioning as described above, GPS position calculation is performed even during the intermittent reception of ephemeris information in order to acquire position data. However, if all that is required is that GPS positioning is quickly performed at the actuation timing of the electronic device 1 or when a given operation is performed, there is no need to perform GPS position calculation for acquiring position data during the intermittent reception of ephemeris information.

In the positioning control processing described above, valid ephemeris information is continually held within the electronic device 1 and the time clocked by the clock circuit 32 is continually corrected to an accurate value. Therefore, even when the GPS positioning processing is requested at an arbitrary timing, radio waves transmitted from the GPS satellites can be captured in a short amount of time and position calculation can also be performed in a short amount of time.

As a result, accurate current position data can be acquired in a short amount of time such as in seconds.

Next, an example of control procedures actualizing the above-described positioning control processing will be described with reference to flowcharts.

FIG. 3 to FIG. 6 are flowcharts of the positioning control processing performed by the sub CPU 21.

Figure 3:
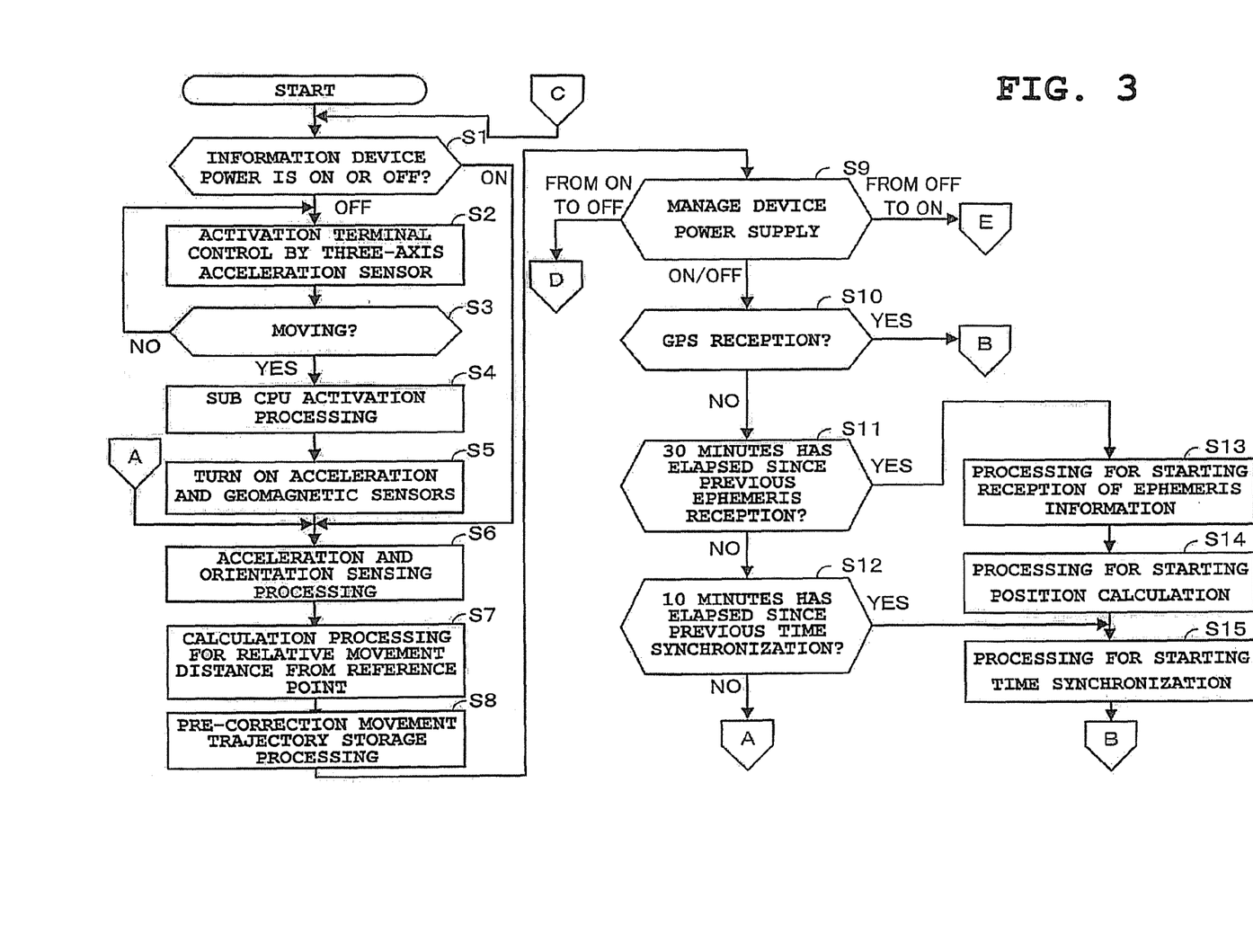
FIG. 3 is a first part of a flowchart showing the procedure of positioning control processing performed by a sub CPU.

The positioning control processing is initiated with the power of the sub CPU 21 being turned ON and is continually performed. In the flowcharts, the processing at Step S1 to Step S3 are not software processing performed by the sub CPU 21, but rather hardware processing based on a device ON flag in a status register controlling the activated state of the sub CPU 21 and an activation control signal outputted from the three-axis acceleration sensor 28 to the sub CPU 21.

That is, when a device ON flag indicating a power supply switching state of the electronic device 1 is set to value "1" indicating that the power is ON, the sub CPU 21 enters the activated state, and when the device ON flag is set to value "0" indicating that the power is OFF, the sub CPU 21 enters a state allowing it to enter the sleep state. Moreover, in the state where the device ON flag is "0", when an activation control signal from the three-axis acceleration sensor 28 is at an ineffective level, the sub CPU 21 enters the sleep state, and when the activation control signal becomes an effective level, the sub CPU 21 is released from the sleep state.

Accordingly, when the judgment of the device ON flag (Step S1) indicates that the power of the electronic device 1 is ON, the sub CPU 21 performs processing from Step S6 since it is in the activated state. Conversely, when the power of the electronic device 1 is OFF, the electronic device 1 is judged whether it is in a moving state or a still state (Step S3) by control based on an activation control signal from the three-axis acceleration sensor 28 (Step S2). When the activation control signal is at an ineffective level ("No" at Step S3), the sub CPU 21 remains in the sleep state, and when the activation control signal from the three-axis acceleration sensor 28 becomes an effective level ("Yes" at Step S3), the sub CPU 21 is activated and performs processing from Step S4.

When processing is started from Step S4 as a result, the sub CPU 21 first performs its own activation processing (Step S4), and after performing processing for turning ON the second processing section 20 including the three-axis acceleration sensor 28 and the three-axis geomagnetic sensor 29 (Step S5), proceeds to Step S6.

At Step S6, the sub CPU 21 first performs the positioning processing through autonomous navigation (Step S6 to Step S8). Specifically, the sub CPU 21 controls the three-axis acceleration sensor 28 and the three-axis geomagnetic sensor 29 to detect acceleration and orientation (Step S6), and after sending the detection data to the autonomous navigation control processing circuit 30, controls it to integrate the movement vector with position data of the reference point and calculate current position data (Step S7). Here, the position data of the reference point refers to position data acquired by the preceding GPS positioning. In a case where the sub CPU 21 has just been activated from the sleep state and has no position data of the reference point, provisional position data is used in its place. Then, when current position data is acquired by the autonomous navigation control processing circuit 30, this current position data is stored in the non-volatile memory 24 as pre-correction movement trajectory data (Step S8).

That is, as a result of the above-described processing at Step S6 to Step S8 being repeatedly performed by loop processing at Step S6 to Step S12, the autonomous navigation positioning processing is continually performed in the background while the sub CPU 21 is running.

After performing the autonomous navigation positioning processing, the sub CPU 21 performs branch processing in accordance with the power supply state of the electronic device 1 (Step S9). Here, when there is no switching of the power, the sub CPU 21 proceeds to Step S10. When there is switching of the power from OFF to ON, the sub CPU 21 proceeds to processing performed when the power is ON (Step S28 to Step S33 in FIG. 5). When there is switching of the power from ON to OFF, the sub CPU 21 proceeds to processing performed when the power is OFF (Step S34 to Step S46).

When there is no switching of the power and the procedure proceeds to Step S10 as a result, the sub CPU 21 first judges whether or not the GPS reception circuit 26 is operating and whether or not any signal is being received from a GPS satellite (Step S10). When judged that no signal is being received, the sub CPU 21 judges whether or not a fixed amount of time (such as 30 minutes) has elapsed since the previous reception of ephemeris information (Step S11). When judged that the fixed amount of time has not elapsed, the sub CPU 21 judges whether or not a fixed amount of time (such as ten minutes) has elapsed since the previous time synchronization (Step S12). Then, when judged that the fixed amount of time has not elapsed, the sub CPU 21 returns directly to Step S6.

Figure 4:
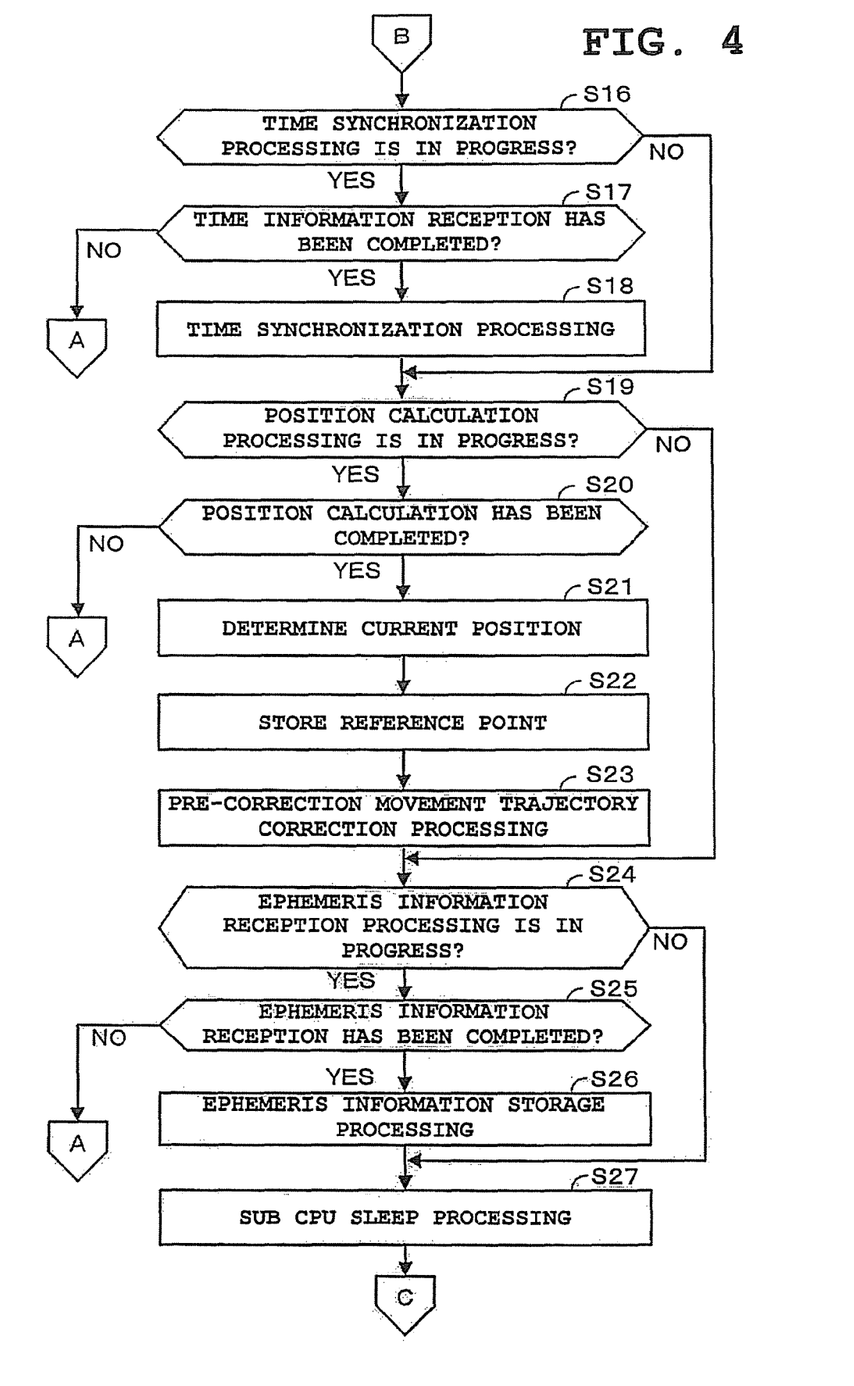
FIG. 4 is a second part of the flowchart showing the procedure of the positioning control processing.

Conversely, when judged that a signal is being received in the judgment processing at Step S10, the sub CPU 21 proceeds to control steps related to signal reception (Step S16 to Step S26 in FIG. 4).

When judged at Step S11 that the fixed amount of time has elapsed, the sub CPU 21 issues a reception start instruction for ephemeris information to the intermittent reception control circuit 27 (Step S13: first reception control step), starts position calculation (GPS position calculation) by the sub CPU 21 itself (Step S14), issues a reception start instruction for time information to the intermittent reception control circuit 27, and starts time synchronization (Step S15: second reception control step), sequentially. Then, the sub CPU 21 proceeds to the control steps related to signal reception (Step S16 to S26).

When judged that the fixed amount of time has elapsed since the previous time synchronization in the judgment processing at Step S12, the sub CPU 21 proceeds to the control steps related to signal reception (Step S16 to Step S26) after performing only the processing for issuing an reception start instruction for time information to the intermittent reception control circuit 27 and starting time synchronization (Step S15).

That is, in the above-described processing at Step S11 to Step S15, the intermittent reception of ephemeris information is started at fixed intervals and the intermittent reception of time information is started at shorter fixed intervals. In addition, when the intermittent reception of ephemeris information is started, positioning and time-matching are also started.

When the procedure proceeds to the control steps related to signal reception (Step S16 to Step S26), the sub CPU 21 first judges whether or not the current processing status indicates that the time synchronization processing is in progress (Step S16). When judged that the time synchronization processing is in progress, the sub CPU 21 checks the intermittent reception control circuit 27 and judges whether or not the reception of time information has been completed (Step S17). Then when judged that the reception has been completed, the sub CPU 21 corrects the time data of the clock circuit 32 based on the received time information (Step S18: time correction step)

and proceeds to the next processing steps (Step S19 to Step S23). Conversely, when judged that the time synchronization processing is not in progress at Step S16, the sub CPU 21 proceeds directly to the next processing steps (Step S19 to Step S23). Also, when judged at Step S17 that the reception has not been completed, the sub CPU 21 returns to Step S6.

When the procedure proceeds to the next processing steps, the sub CPU 21 first judges whether or not the current processing status indicates that the position calculation processing is in progress (Step S19). When judged that the position calculation processing is in progress, the sub CPU 21 judges whether or not the position calculation has been completed (Step S20). Then, when judged that the position calculation has been completed, the sub CPU 21 acquires current position data based on a result of the calculation (Step S21), updates the reference point for autonomous navigation positioning with the current position data (Step S22), sends this position data to the autonomous navigation error correction processing circuit 31, and instructs it to perform correction processing on previously acquired position data by autonomous navigation positioning (Step S23), sequentially. The sub CPU 21 then proceeds to the next processing steps (Step S24 to Step S26). Conversely, when judged that the position calculation processing is not in progress at Step S19, the sub CPU 21 proceeds directly to the next processing steps (Step S24 to Step S26). Also, when judged at Step S20 that the position calculation has not been completed, the sub CPU 21 returns to Step S6.

When the procedure proceeds to the next processing steps, the sub CPU 21 first judges whether or not the current processing status indicates that the ephemeris information reception processing is in progress (Step S24). When judged that the ephemeris information reception processing is in progress, the sub CPU 21 checks the intermittent reception control circuit 27 and judges whether or not the reception of ephemeris information has been completed (Step S25). Then, when judged that the reception has been completed, the sub CPU 21 stores the received ephemeris information in the non-volatile memory 24 (Step S26: route information storage step) and proceeds to the next Step S27. Conversely, when judged that the ephemeris information reception processing is not in progress at Step S24, the sub CPU 21 proceeds directly to the following Step S27. Also, when judged at Step 25 that the reception has not been completed in the judgment processing, the sub CPU 21 returns to Step S6.

That is, when there is no change in the switching state of the power supply after any of the ephemeris information reception processing, the time information reception processing, and the position calculation processing is initiated, the loop processing at Step S6 to Step S10, Step S16, and the subsequent steps is repeated, and whether or not information reception has been completed or whether or not position calculation has been completed is judged during the loop processing. When it is judged that the reception has been completed, necessary processing such as time synchronization (Step S18) and the ephemeris information storage processing (Step S26) is performed. When it is judged that the position calculation has been completed, necessary processing such as the setting of a reference point (Step S22) and the correction of position data through autonomous navigation (Step S23) is performed.

Then, after the ephemeris information reception processing, the time information reception processing, or the position calculation processing is initiated, when all of the processing is completed, the sub CPU 21 exits the above-described loop processing and performs processing for entering the sleep state (Step S27). Here, if the power of the electronic device 1 is OFF and an activation control signal from the three-axis acceleration sensor 28 is at an ineffective level, the sub CPU 21 enters the sleep state and, after the power of the second processing section 20 is turned OFF, returns to the activation-standby processing state at Step S2 and Step S3. Conversely, if the power of the electronic device 1 is ON or an activation control signal from the three-axis acceleration sensor 28 is at an effective level, the sub CPU 21 continues processing from Step S6 without entering the sleep state.

Next, the processing performed when the power is ON will be described. When the power of the electronic device 1 is switched from OFF to ON and the procedure branches off to the processing performed when the power is ON in the judgment processing at Step S9 (Step S28 to Step S33 in FIG. 5), the sub CPU 21 first sets the device ON flag indicating the power supply state of the electronic device 1 to "1" (Step S28), and then performs processing corresponding to the activation of the electronic device 1 (referred to as "information device") so as to enable the exchange of instructions and information with the main CPU 11 (Step S29).

Figure 5:
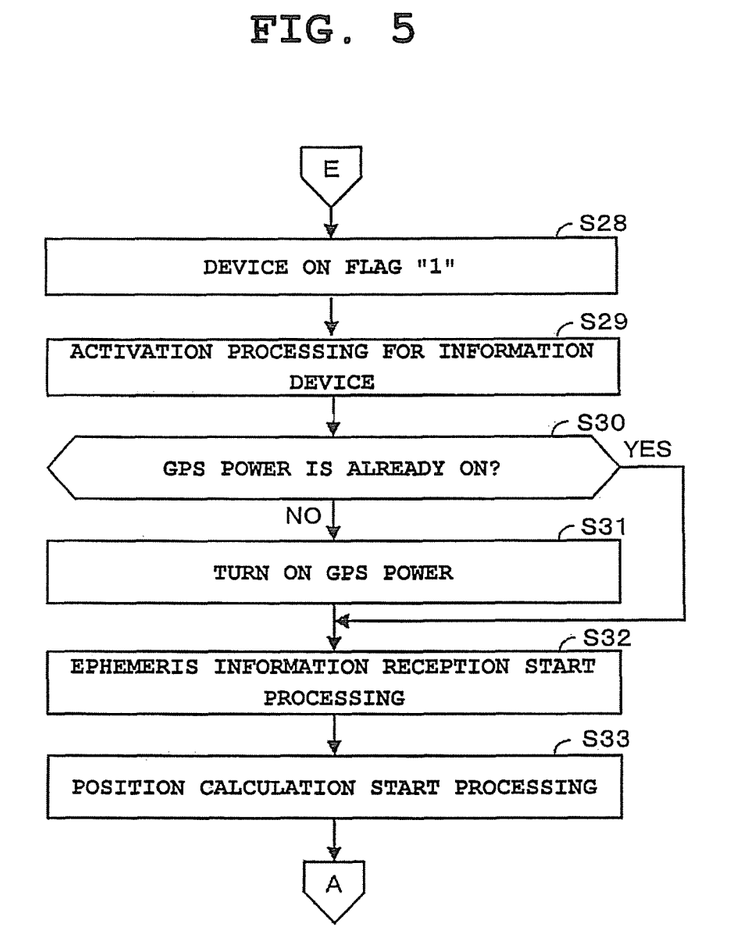
FIG. 5 is a third part of the flowchart showing the procedure of the positioning control processing.

In addition, the sub CPU 21 judges whether or not the power of the GPS reception circuit 26 is already ON (Step S30). When judged that the power is OFF, the sub CPU 21 turns ON the power (Step S31), and after issuing an reception start instruction for ephemeris information to the intermittent reception control circuit 27 (Step S32), starts position calculation (GPS position calculation) by the sub CPU 21 itself (Step S33: positioning step). In the position calculation at Step S33, the sub CPU 21 performs the calculation of a position using ephemeris information stored in the non-volatile memory 24. Then, after initiating these processing, the sub CPU 21 returns to Step S6.

That is, as a result of the above-described processing at Step S32 and Step S33, positioning through GPS and the associated reception processing for ephemeris information are initiated when the power key 15 of the electronic device 1 is switched from OFF to ON.

Next, processing performed when the power is OFF will be described. When the power of the electronic device 1 is switched from ON to OFF, and the sub CPU 21 branches off to the processing performed when the power is OFF in the judgment processing at Step S9 (Step S34 to Step S36 in FIG. 6), the sub CPU 21 first judges whether or not the current processing status indicates that the ephemeris information reception processing is in progress (Step S34). When judged that the reception processing is in progress, the sub CPU 21 checks the intermittent reception control circuit 27 and judges whether or not the reception of ephemeris information has been completed (Step S35). Then, when judged that the reception has been completed, the sub CPU 21 stores the received ephemeris information in the non-volatile memory 24 (Step S36) and proceeds to the next Step S37. Conversely, when judged at Step S34 that the ephemeris information reception processing is not in progress, the sub CPU 21 proceeds directly to the following Step S37.

Figure 6:
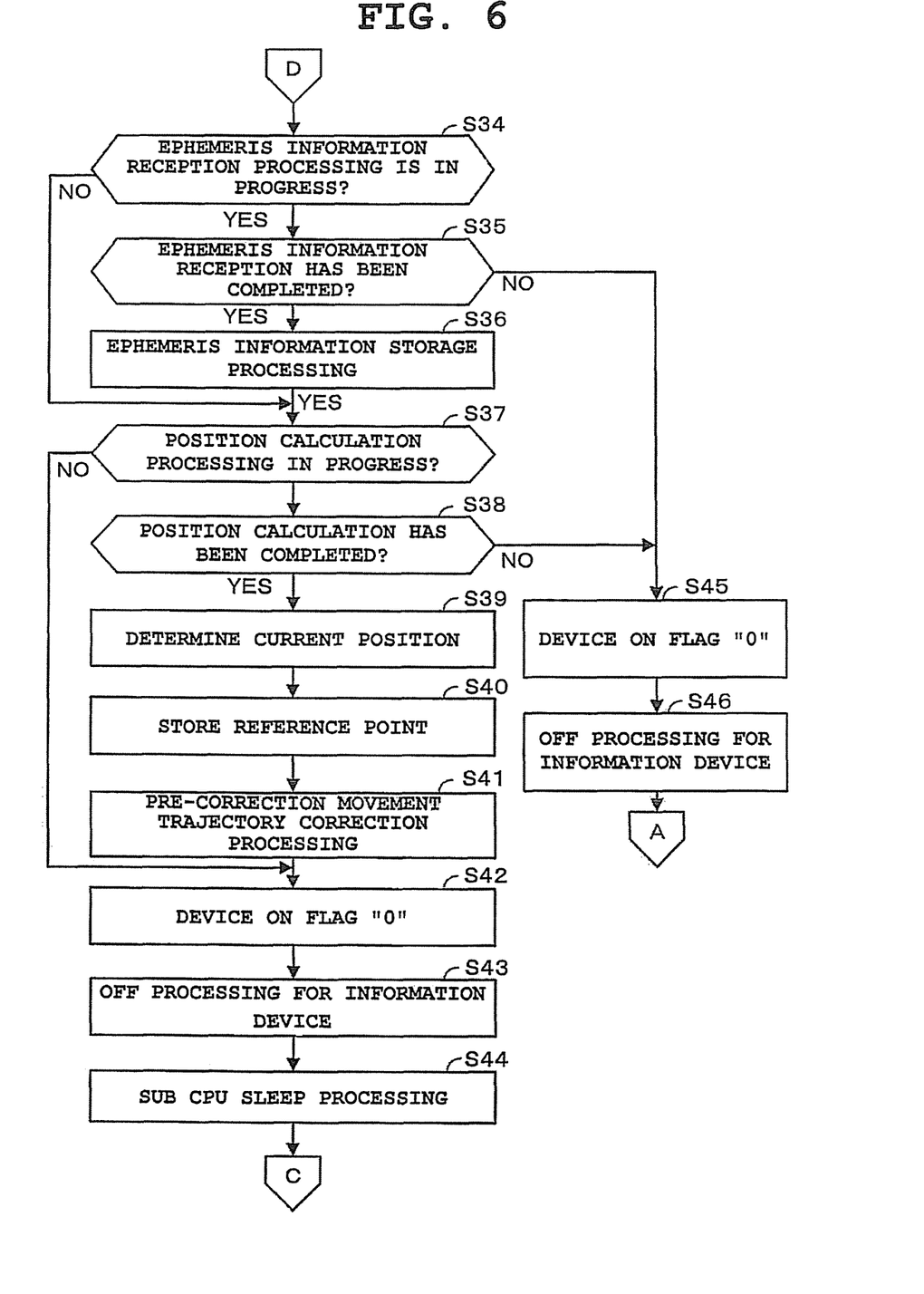
FIG. 6 is a fourth part of the flowchart showing the procedure of the positioning control processing.

At Step S37, the sub CPU 21 judges whether or not the position calculation processing is in progress (Step S37). When judged the position calculation processing is in progress, the sub CPU 21 judges whether or not the position calculation has been completed (Step S38). When judged that the position calculation has been completed, the sub CPU 21 acquires current position data based on a result of the calculation (Step S39), updates the reference point for autonomous navigation positioning with the current position data (Step S40), sends this position data to the autonomous navigation error correction processing circuit 31, and instructs it to perform correction processing on position data previously acquired by autonomous navigation positioning (Step S41), sequentially. The sub CPU 21 then proceeds to the following Step S42. Conversely, when judged at Step S37 that the position calculation processing is not in progress, the sub CPU 21 proceeds directly to the following Step S42.

At Step S42, the sub CPU 21 sets the device ON flag indicating the power supply state of the electronic device 1 to "0" (Step S42), and after performing processing corresponding to the turning-off of the electronic device 1 (referred to as the "information device") such as terminating a communicating state with the main CPU 11 (Step S43), performs processing for entering the sleep state (Step S44). Here, if the electronic device 1 is in the still state and an activation control signal from the three-axis acceleration sensor 28 is at an ineffective level, the sub CPU 21 enters the sleep state and, after the power of the second processing section 20 is turned OFF, returns to the activation-standby processing state at Step S2 and Step S3. Conversely, if an acceleration change has been detected by the three-axis acceleration sensor 28, and an activation control signal from the three-axis acceleration sensor 28 is at an effective level, the sub CPU 21 continues processing from Step S6 without entering the sleep state.

Also, when judged that the reception of ephemeris information has not been completed in the judgment processing at Step S35 or when judged that the position calculation has not been completed in the judgment processing at Step S38, the sub CPU 21 sets the device ON flag indicating the power supply state of the electronic device 1 to "0" (Step S45), and after performing processing corresponding to the turning-off of the electronic device 1 such as terminating a communicating state with the main CPU 11 (Step S46), returns to Step S6.

That is, even when the power of the electronic device 1 is turned OFF as a result of the above-described processing at Step S34 to Step S46, if the ephemeris information reception processing and the position calculation processing have been initiated, the processing for turning OFF the power is not performed until these processing are completed.

As a result of the above-described positioning control processing in FIG. 3 to FIG. 6, the intermittent reception of ephemeris information and of time information as shown in FIG. 2, and quick positioning when the power of the electronic device 1 is turned ON at an arbitrary timing are actualized.

As described above, in the electronic device 1 according to the embodiment, a state where ephemeris information required for GPS position calculation has been held is maintained most of the time, as a result of the intermittent reception of ephemeris information. In addition, a state where there is only a small margin of error in the time clocked by the clock circuit 32 is maintained most of the time, as a result of the intermittent reception of time information. Therefore, radio waves transmitted from GPS satellites can be captured in a short amount of time through use of accurate clocked time even when GPS positioning is performed at an arbitrary timing. In addition, its current position can be determined in a short amount of time through position calculation using ephemeris information held therein.

Moreover, in the electronic device 1 according to the embodiment, the intermittent reception of time information is performed at shorter intervals than reception intervals for ephemeris information. Therefore, the intermittent reception of ephemeris information can be performed at reception intervals optimized for holding required ephemeris information, and the intermittent reception of time information can be performed at reception intervals optimized for maintaining accurate clocked time required for capturing transmitted radio waves. As a result, the retention of required ephemeris information and correction processing for required clocked time through efficient intermittent reception can be actualized.

Furthermore, in the electronic device 1 according to the embodiment, the reception interval for the ephemeris information is 30 minutes and the reception interval for the time information is 10 minutes. Therefore, intermittent reception optimized for the retention of required ephemeris information and correction processing for required clocked time is realized. Note that, even when the reception interval for ephemeris information is set accordingly to be within an hour and the reception interval for time information is set accordingly to be within 30 minutes, intermittent reception almost as optimal as the above can be realized.

Still further, in the electronic device 1 according to the embodiment, ephemeris information and time information are intermittently received in the background even when the power of the electronic device 1 is turned OFF. Therefore, even immediately after the power of the electronic device 1 is turned ON, positioning can be performed in a short amount of time.

Yet still further, in the electronic device 1 according to the embodiment, the intermittent reception of ephemeris information and of time information is stopped during a period in which the electronic device 1 is judged to be completely unused, through control by the three-axis acceleration sensor 28. Therefore, wasteful energy consumption while the electronic device 1 is not in use can be prevented.

Note that the present invention is not limited to the above-described embodiment, and various modifications cam be made. For example, in the above embodiment, the predetermined reception interval at which ephemeris information is intermittently received can be a reception interval whose length changes under predetermined conditions, as described above. In addition, the predetermined reception interval at which time information is received can also be a reception interval whose length changes under predetermined conditions.

Moreover, in the above embodiment, an example is described in which positioning is performed using GPS and ephemeris information is applied as route information. However, in a case where the positioning is performed using a positioning system constituted by a different positioning satellite, route information of a GPS satellite required for position calculation in this positioning system is applied as the route information.

Furthermore, in the above embodiment, the intermittent reception of ephemeris information and of time information is stopped only when the power of the electronic device 1 is turned OFF and the electronic device 1 is in a predetermined still state. However, for example, two power switches, a first power switch and a second power switch, may be provided, and the intermittent reception may be continued when only the first power switch is turned OFF and stopped when the second power switch is turned OFF. Alternatively, the intermittent reception may be continued or stopped based only on a judgment as to whether or not the electronic device 1 is in a predetermined still state, regardless of the power supply state.

Still further, the timing at which positioning by a positioning satellite is started is not limited to when the power is turned ON. In addition, a configuration in which positioning is not performed during the intermittent reception of ephemeris information is also applicable. Also, positioning through autonomous navigation does not necessarily have to be performed. Lastly, other details of the configurations and methods described according to the embodiment can be modified accordingly without departing from the spirit of the invention.

While the present invention has been described with reference to the preferred embodiments, it is intended that the invention be not limited by any of the details of the description therein but includes all the embodiments which fall within the scope of the appended claims.

What is claimed is:

1. A positioning device comprising:
   a reception means for receiving a signal transmitted from a positioning satellite;
   a clocking means for clocking time;
   a first reception control means for receiving route information required for positioning from the positioning satellite via the reception means;
   a storage means for storing the received route information;
   a second reception control means for receiving time information indicating time from the positioning satellite via the reception means;
   a time correction means for correcting the time clocked by the clocking means based on the received time information; and
   a positioning means for capturing the signal transmitted from the positioning satellite based on the time clocked by the clocking means and performing positioning based on the transmitted signal and the route information stored in the storage means;
   wherein the first reception control means intermittently receives the route information at a predetermined reception interval, and the second reception control means intermittently receives the time information even during a period in which the positioning by the positioning means is not performed.

2. The positioning device according to claim 1, wherein the first reception control means intermittently receives the route information at a first reception interval, and the second reception control means intermittently receives the time information at a second reception interval that is shorter than the first reception interval.

3. The positioning device according to claim 1, wherein the positioning satellite is a global positioning system satellite and the route information is ephemeris information.

4. The positioning device according to claim 3, wherein the first reception control means intermittently receives the route information at a reception interval of within an hour and the second reception control means intermittently receives the time information at a reception interval of within 30 minutes.

5. The positioning device according to claim 1, further comprising:
   a power supply switching means for switching power of the positioning means between ON and OFF;
   wherein the first reception control means and the second reception control means intermittently receive the route information and the time information even during a period in which the power is switched OFF by the power supply switching means.

6. The positioning device according to claim 1, further comprising:
   a movement detection means for detecting movement;
   wherein the first reception control means and the second reception control means continue intermittent reception of the route information and the time information during a period in which the positioning device is determined not to be in a still state based on the detection by the movement detection means.

7. A positioning method of performing positioning using a reception means for receiving a signal transmitted from a positioning satellite and a clocking means for clocking time, comprising:
   a first reception control step of receiving route information required for the positioning from the positioning satellite via the reception means;
   a route information storage step of storing the received route information in a storage means;
   a second reception control step of receiving time information indicating time from the positioning satellite via the reception means;
   a time correction step of correcting the time clocked by the clocking means based on the received time information; and
   a positioning step of capturing the signal transmitted from the positioning satellite and received by the reception means based on the time clocked by the clocking means, and performing positioning based on the transmitted signal and the route information stored in the storage means;
   wherein the route information is intermittently received at a predetermined reception interval in the first reception control step, and the time information is intermittently received even during a period in which the positioning in the positioning step is not performed, in the second reception control step.

8. A non-transitory computer-readable recording medium having a program stored thereon which is executable by a computer controlling reception processing for receiving a signal transmitted from a positioning satellite and clocking processing for clocking time, the program being executable to perform functions comprising:
   first reception control processing for receiving route information required for positioning from the positioning satellite through the reception processing;
   route information storage processing for storing the received route information in a storage section;
   second reception control processing for receiving time information indicating time from the positioning satellite through the reception processing;
   time correction processing for correcting the time clocked by the clocking processing based on the received time information; and
   positioning processing for capturing the signal transmitted from the positioning satellite in the reception processing based on the time clocked by the clocking processing, and performing positioning based on the transmitted signal and the route information stored in the storage processing;
   wherein the route information is intermittently received at a predetermined reception interval in the first reception control processing, and the time information is intermittently received even during a period in which the positioning by the positioning processing is not performed, in the second reception control processing.

* * * * *